United States Patent
Nakayama et al.

(10) Patent No.: US 8,303,377 B2
(45) Date of Patent: Nov. 6, 2012

(54) HEAT-RESISTANT ROLL, PRODUCTION METHOD THEREOF, AND METHOD OF PRODUCING SHEET GLASS USING HEAT-RESISTANT ROLL

(75) Inventors: Masaaki Nakayama, Hamamatsu (JP); Daiji Tahara, Tokyo (JP); Kouji Iwata, Hamamatsu (JP); Kazuhisa Watanabe, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 521 days.

(21) Appl. No.: 12/585,289

(22) Filed: Sep. 10, 2009

(65) Prior Publication Data

US 2010/0064729 A1 Mar. 18, 2010

(30) Foreign Application Priority Data

Sep. 17, 2008 (JP) .................................. 2008-238316

(51) Int. Cl.
*B24B 1/00* (2006.01)
(52) U.S. Cl. ................. 451/49; 451/57; 451/60
(58) Field of Classification Search ........... 451/49, 451/55, 51, 57–60
See application file for complete search history.

(56) References Cited

U.S. PATENT DOCUMENTS

| | | | | |
|---|---|---|---|---|
| 5,148,639 A * | 9/1992 | Sakai et al. | .................. | 451/59 |
| 6,468,138 B1 * | 10/2002 | Toyama et al. | ................. | 451/49 |
| 6,988,937 B2 * | 1/2006 | Bonner et al. | .................. | 451/49 |
| 8,029,338 B2 * | 10/2011 | Kumar et al. | .................. | 451/49 |
| 2003/0181302 A1 | 9/2003 | Kaiser et al. | | |
| 2004/0220032 A1 | 11/2004 | Nakayama et al. | | |
| 2005/0212158 A1 | 9/2005 | Kaiser | | |
| 2005/0212758 A1 | 9/2005 | Marvit et al. | | |
| 2007/0231526 A1 | 10/2007 | Nakayama et al. | | |

FOREIGN PATENT DOCUMENTS

| | | |
|---|---|---|
| JP | A-64-061371 | 3/1989 |
| JP | A-2004-299980 | 10/2004 |
| JP | A-2005-520774 | 7/2005 |
| JP | A-2007-269604 | 10/2007 |
| WO | WO 03/082755 A1 | 10/2003 |

OTHER PUBLICATIONS

Japanese Office Action issued in Japanese Application No. 2009-203410 dated Jan. 17, 2012 (with concise explanation of relevance).

* cited by examiner

*Primary Examiner* — Dung Van Nguyen (74) *Attorney, Agent, or Firm* — Oliff & Berridge, PLC (57) ABSTRACT

Provide is a heat-resistant roll with improved effectively characteristics, a production method thereof, and a method of producing sheet glass using the heat-resistant roll. A method of producing a heat-resistant roll equipped with a roll portion containing 5% by weight or more of clay includes: a grinding step (S101) of grinding a roll surface of the roll portion; and a surface treatment step (S102) of performing surface treatment of smoothening the ground roll surface in a wet state.

5 Claims, 6 Drawing Sheets

| PRESENT PRODUCT | ARITHMETIC AVERAGE ROUGHNESS ($\mu$m) | 0.95 |
|---|---|---|
| | MAXIMUM HEIGHT ($\mu$m) | 7.04 |
| | TEN-POINT AVERAGE ROUGHNESS ($\mu$m) | 8.55 |
| COMPARATIVE PRODUCT I | ARITHMETIC AVERAGE ROUGHNESS ($\mu$m) | 8.03 |
| | MAXIMUM HEIGHT ($\mu$m) | 40.50 |
| | TEN-POINT AVERAGE ROUGHNESS ($\mu$m) | 44.61 |
| COMPARATIVE PRODUCT II | ARITHMETIC AVERAGE ROUGHNESS ($\mu$m) | 6.18 |
| | MAXIMUM HEIGHT ($\mu$m) | 36.37 |
| | TEN-POINT AVERAGE ROUGHNESS ($\mu$m) | 37.72 |

FIG.8

| | POWDER AMOUNT (mg/cm$^2$) |
|---|---|
| PRESENT PRODUCT | 0.02 |
| COMPARATIVE PRODUCT I | 0.27 |
| COMPARATIVE PRODUCT II | 0.24 |

FIG.9

| | LIGHTNESS INDEX L |
|---|---|
| PRESENT PRODUCT | 28.72 |
| COMPARATIVE PRODUCT I | 55.47 |
| COMPARATIVE PRODUCT II | 49.11 |

FIG.10

| | | PRESENT PRODUCT I | PRESENT PRODUCT II | PRESENT PRODUCT III | PRESENT PRODUCT IV | PRESENT PRODUCT V | PRESENT PRODUCT VI | PRESENT PRODUCT VII | PRESENT PRODUCT VIII | PRESENT PRODUCT IX | COMPARATIVE PRODUCT I | COMPARATIVE PRODUCT II |
|---|---|---|---|---|---|---|---|---|---|---|---|---|
| COMPOSITION (% BY WEIGHT) | CLAY | KIBUSHI CLAY | 35 | 35 | 35 | 35 | 15 | 45 | | | 15 | 35 | 35 |
| | | KAOLIN CLAY | | | | | | | | 20 | 15 | | |
| | INORGANIC FIBER | ALUMINA-SILICA FIBER | 15 | 15 | 15 | 15 | 15 | 15 | 20 | | 15 | 15 | 15 |
| | | ALUMINA FIBER | | | | | | | | 40 | | | |
| | FILLER | WOLLASTONITE | 40 | 40 | 40 | 40 | 60 | 30 | | | 45 | 40 | 40 |
| | | ALUMINA | | | | | | | | | | | |
| | | MICA | | | | | | | 30 | 30 | | | |
| | ASSISTANT | PULP | 5 | 5 | 5 | 5 | 5 | 5 | 5 | 5 | 5 | 5 | 5 |
| | | ORGANIC BINDER | 5 | 5 | 5 | 5 | 5 | 5 | 5 | 5 | 5 | 5 | 5 |
| PRODUCTION METHOD | FORMING METHOD OF DISK MEMBER | | PAPERMAKING | | | | | | MOLDING | | | PAPERMAKING | |
| | SURFACE TREATMENT | i) STEP OF WETTING | WET PAPER | | | | WET PAPER | | | | | NONE | SPRAY |
| | | ii) STEP OF SMOOTHENING | | | | | SAND PAPER | | | | | | NONE |
| | | NUMBER OF REPETITION(S) OF i and ii | 0 | 2 | 0 | 2 | 0 | 0 | 0 | 0 | 0 | - | - |
| EVALUATION | SURFACE ROUGHNESS (μm) | ARITHMETIC AVERAGE ROUGHNESS | 0.95 | 0.86 | 0.85 | 0.69 | 1.57 | 1.97 | 0.98 | 0.96 | 0.95 | 8.03 | 6.18 |
| | | MAXIMUM HEIGHT | 7.04 | 6.68 | 6.69 | 5.55 | 8.97 | 9.98 | 7.24 | 7.08 | 6.99 | 40.50 | 36.37 |
| | | TEN-POINT AVERAGE ROUGHNESS | 8.55 | 8.01 | 7.99 | 6.88 | 10.88 | 11.23 | 8.80 | 8.65 | 8.54 | 44.61 | 37.72 |
| | POWDER AMOUNT (mg/cm²) | | 0.02 | 0.02 | 0.02 | 0.01 | 0.06 | 0.09 | 0.03 | 0.03 | 0.02 | 0.27 | 0.24 |
| | LIGHTNESS INDEX L | | 28.72 | 28.7 | 28.71 | 28.53 | 33.42 | 35.66 | 29.45 | 29.35 | 28.99 | 55.47 | 49.11 |
| | TOTAL CHARACTERISTICS | | ◎ | ◎+ | ◎+ | ◎++ | ○ | ○ | ◎ | ◎ | ◎ | × | × |

HEAT-RESISTANT ROLL, PRODUCTION METHOD THEREOF, AND METHOD OF PRODUCING SHEET GLASS USING HEAT-RESISTANT ROLL

CROSS-REFERENCE TO RELATED APPLICATION

The present application claims priority from Japanese application JP 2008-238316 filed on Sep. 17, 2008, the content of which is hereby incorporated by reference into this application.

BACKGROUND OF THE INVENTION

1. Field of the Invention

The present invention relates to a heat-resistant roll, a production method thereof, and a method of producing a sheet glass: using the heat-resistant roll. In particular, the present invention relates to the improvement of heat-resistant roll characteristics such as a low dust-generating property.

2. Description of the Related Art

In the production of sheet glass, a heat-resistant roll equipped with a roll portion containing clay is used for conveying a glass ribbon in a molten state. In order to produce sheet glass of high quality suitable for a liquid crystal display and a plasma display, it is necessary to minimize the adverse influence of the heat-resistant roll on the glass ribbon. In this regard, conventionally, a heat-resistant roll in which a surface of the roll portion is finished by grinding has been used (for example, see JP 2004-299980 A, JP 2007-269604 A, and JP 2005-520774 A.

SUMMARY OF THE INVENTION

However, in the conventional heat-resistant roll finished by grinding, the smoothness of the surface of the roll portion and the characteristics such as a low dust-generating property from the surface were not necessarily sufficient.

The present invention has been achieved in view of the above-mentioned problems, and one of the objects of the present invention is to provide a heat-resistant roll in which the surface of a roll portion is highly smoothened and dust-generating risk is reduced effectively, a production method thereof, and a method of producing sheet glass using the heat-resistant roll.

In order to solve the above-mentioned problems, according to an embodiment of the present invention, a method of producing a heat-resistant roll equipped with a roll portion containing 5% by weight or more of clay comprises:

a grinding step of grinding a roll surface of the roll portion; and a surface treatment step of performing surface treatment of smoothening the ground roll surface in a wet state. The present invention provides a method of producing a heat-resistant roll in which the roll surface of the roll portion is highly smoothened and dust-generating risk is reduced effectively.

Further, in the above-mentioned method of producing a heat-resistant roll, in the surface treatment step, the surface treatment may be performed by conducting a first step of wetting the ground roll surface and a second step of smoothening the wet roll surface. Further, in this case, in the second step, the roll surface may be smoothened by rotating the roll portion while pressing a substrate against the wet roll surface. This enables efficient production of a heat-resistant roll in which the surface of the roll portion is highly smoothened, and dust-generating risk is effectively reduced.

Further, in the above-mentioned method of producing a heat-resistant roll, in the surface treatment step, the surface treatment may be performed by pressing a wet substrate against the roll surface of the rotating roll portion. This enables efficient production of a heat-resistant roll in which the surface of the roll portion is highly smoothened, and dust-generating risk is effectively reduced.

Further, in the above-mentioned method of producing a heat-resistant roll, in the surface treatment step, the surface treatment may be performed on the roll surface of the roll portion rotating in one circumferential direction, and subsequently, a repeated surface treatment in which the surface treatment is performed with a rotation direction of the roll portion being switched to an opposite direction may be performed at least once. This enables efficient production of a heat-resistant roll in which the surface of the roll portion is highly smoothened, and dust-generating risk is effectively reduced.

In order to solve the above-mentioned problems, according to an embodiment of the present invention, a heat-resistant roll equipped with a roll portion containing 5% by weight or more of clay is characterized in that a surface part of the roll portion is made denser compared with an inside of the roll portion. The present invention provides a heat-resistant roll in which the surface of the roll portion is highly smoothened and dust-generating risk is effectively reduced.

In order to solve the above-mentioned problems, a method of producing sheet glass according to an embodiment of the present invention is characterized by using the above-mentioned heat-resistant roll as a roll for conveyance. The present invention provides a method of producing sheet glass of high quality suitable for a liquid crystal display and a plasma display.

The present invention provides a heat-resistant roll in which the surface of the roll portion is highly smoothened and dust-generating risk is effectively reduced, a production method thereof, and a method of producing sheet glass using the heat-resistant roll.

DETAILED DESCRIPTION OF THE INVENTION

Hereinafter, a heat-resistant roll according to an embodiment of the present invention, a production method thereof, and a method of producing sheet glass using the heat-resistant roll are described with reference to the drawings. In this embodiment, description is mainly given of an example in which the heat-resistant roll according to the present invention is realized as a disk roll having a plurality of stacked disk members. However, the present invention is not limited thereto.

Figure 1:
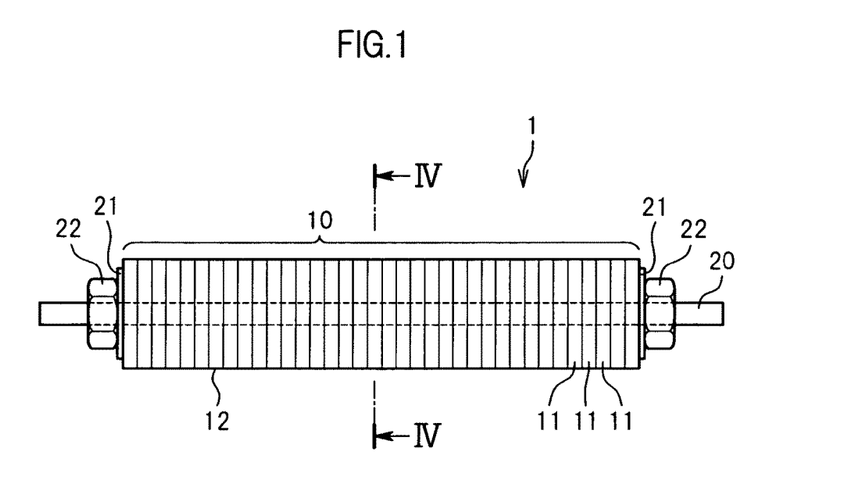
FIG. 1 is an explanatory view illustrating an example of a heat-resistant roll according to an embodiment of the present invention.

First, the outline of a disk roll according to this embodiment and a method of producing a sheet glass using the disk roll are described. FIG. 1 illustrates an example of a disk roll 1. As illustrated in FIG. 1, the disk roll 1 has a cylindrical roll portion 10 extending in a longitudinal direction thereof.

The roll portion 10 has a configuration in which a plurality of disk members 11 containing 5% by weight or more of clay are stacked in the longitudinal direction of the roll portion 10. More specifically, the plurality of disk members 11 constituting the roll portion 10 are fitted by insertion onto a shaft portion 20 to be a rotation shaft of the disk roll 1.

The plurality of stacked disk members 11 are fixed with flanges 21 and nuts 22 provided respectively at both ends of the shaft portion 20, wherein the disk members 11 are compressed in the longitudinal direction of the shaft portion 20. Thus, the surface of the roll portion 10 (hereinafter, referred to as "roll surface 12") has a configuration in which outer circumferential surfaces of the plurality of disk members 11 stacked under compression are continuous with each other.

The shaft portion 20 generally made of metal has a thermal expansion ratio larger than that of the disk members 11. Therefore, when the disk roll 1 is heated, for example, the thermal expansion of the shaft portion 20 is larger than that of the disk members 11 fitted onto the shaft portion 20.

In this regard, an expansion margin in the case of heating can be kept in the roll portion 10 by fixing the plurality of disk members 11 under compression in the longitudinal direction of the shaft portion 20 as described above. Thus, even in the case where the disk roll 1 is heated, the roll portion 10 can follow the thermal expansion of the shaft portion 20.

Consequently, during the production and use of the disk roll 1, problems such as the separation of the plurality of disk members 11 and the formation of cracks in the roll portion 10 caused by the change in temperature can be prevented effectively. However, it should be noted that the method of fixing the plurality of disk members 11 is not limited thereto, and they may be fixed without compression.

Figure 2:
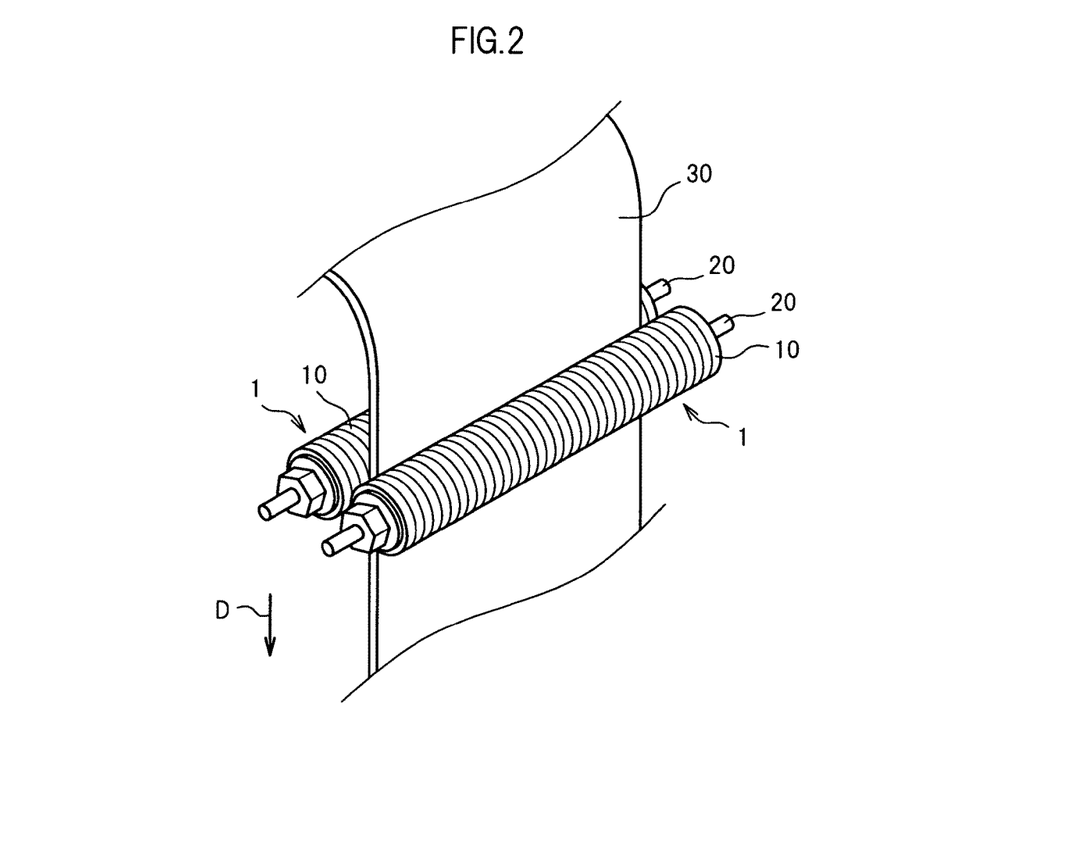
FIG. 2 is an explanatory view illustrating an example of the production of sheet glass using the heat-resistant roll illustrated in FIG. 1.

The disk roll 1 can be used as a roll for conveyance in the production of sheet glass. FIG. 2 illustrates an example of the disk roll 1 used as a roll for conveyance in the production of sheet glass. As illustrated in FIG. 2, in a production device (not shown) of sheet glass, a pair of disk rolls 1 placed in parallel are disposed rotatably with respect to the shaft portion 20. The disk rolls 1 may be connected to a power generating device (not shown). In this case, the disk rolls 1 can rotate based on the power generated by the power generating device.

Then, a glass ribbon 30 in a molten state sent from an upstream side of a conveying path is conveyed to a downstream side while being sandwiched between the pair of rotating roll portions 10. More specifically, in the example illustrated in FIG. 2, the glass ribbon 30 is conveyed downward in a vertical direction (direction indicated by an arrow D illustrated in FIG. 2).

The glass ribbon 30 is cooled slowly while being conveyed by the disk rolls 1. Although only one pair of disk rolls 1 are illustrated in FIG. 2, two or more pairs of disk rolls 1 may be set along the conveying path.

Further, the roll surface 12 may have a surface portion (non-contact portion) that does not come into contact with the glass ribbon 30 that is being conveyed in the production of sheet glass. More specifically, in the example illustrated in FIG. 2, for example, both end portions of the roll surface 12, placed further outside of the glass ribbon 30 in the width direction of the glass ribbon 30, are non-contact portions.

Further, the disk roll 1 can also be used as a pulling roll that applies tension to the glass ribbon 30 so as to adjust a nominal thickness of sheet glass to be produced. More specifically, for example, the pulling rolls composed of the pair of disk rolls 1 are used for pulling the glass ribbon 30 formed of molten glass that has overflowed from a pipe in the overflow downdraw fusion method. At this time, the nominal thickness of a sheet glass to be produced can be adjusted by the pulling speed of the glass ribbon 30 by the pulling rolls.

Thus, in the production of sheet glass, the roll surface 12 that comes into contact with the glass ribbon 30 needs to have characteristics such as a heat resistance capable of withstanding a high temperature equal to or higher than the melting temperature of glass, a smoothness that does not damage the glass ribbon 30 with which the roll surface 12 comes into contact, and a low dust-generating property that does not contaminate the glass ribbon 30.

Particularly, in the case of producing a thin sheet glass of high quality to be used in a liquid crystal display and a plasma display, the roll surface 12 is required to have a highly clean property. Thus, in the case where the roll surface 12 has the non-contact portion, not only a portion of the roll surface 12 that comes into contact with the glass ribbon 30 but also the non-contact portion that does not come into contact with the glass ribbon 30 are also required to have excellent characteristics such as heat resistance and low dust-generating property.

In this regard, the inventors of the present invention carried out intensive studies, and consequently discovered that an effective reduction of dust-generation while maintaining the heat resistance is achieved by making the roll surface 12 dense without changing the composition of the roll surface 12 substantially.

Figure 3:
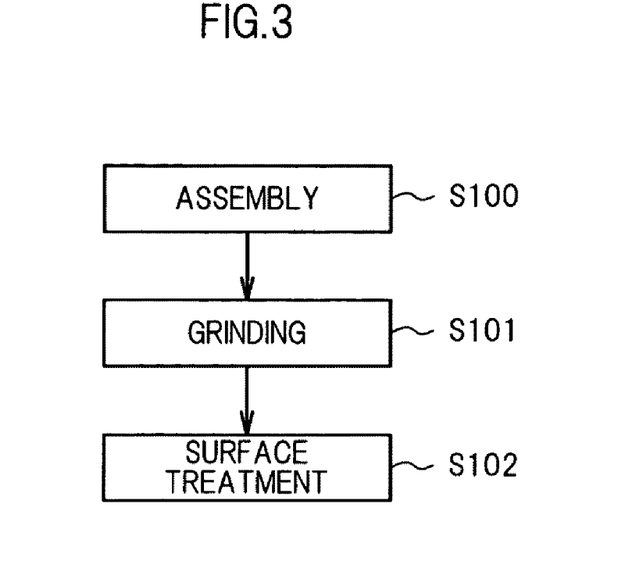
FIG. 3 is a flowchart illustrating main steps included in an example of a method of producing a heat-resistant roll according to an embodiment of the present invention.

Next, the disk roll 1 with such excellent characteristics and a method of producing the disk roll 1 (hereinafter, referred to as "the present method of production") are described. FIG. 3 illustrates main steps included in an example of the present method of production. As illustrated in FIG. 3, the present method of production includes an assembly step S100, a grinding step S101, and a surface treatment step S102.

In the assembly step S100, the plurality of disk members 11 are produced, and the disk roll 1 is assembled using the plurality of disk members 11. In the production of the disk members 11, first, an aqueous slurry is prepared and a sheet-shaped body (so-called millboard) with a predetermined thickness is produced from the aqueous slurry.

The aqueous slurry is prepared so as to have a composition corresponding to a composition which the disk members 11 to be produced should finally have. More specifically, for example, the aqueous slurry contains clay in an amount required for achieving the content of 5% by weight or more in the disk members 11 mounted on the disk roll 1.

Any kind of clay can be appropriately selected as the clay without a particular limit, as long as the clay exhibits viscosity and plasticity when it gets wet in the surface treatment step S102 described later, and one kind can be used alone or two or more kinds can be used in combination.

Further, as the clay, that which has a property of being sintered by heating can be preferably used. Specifically, for example, refractory clay such as kibushi clay and Gairome clay, bentonite, or kaolin can be used, and the refractoy clay can preferably be used. Among them, the kibushi clay is preferred because it has a high binder effect with sintering and contains less impurities.

Further, the aqueous slurry can also contain an inorganic fiber and a filler. Any kind of an inorganic fiber can be appropriately selected as the inorganic fiber without a particular limit, as long as the fiber can be a reinforcing material that enhances the strength of the disk members 11. One kind can be used alone or two or more kinds can be used in combination.

More specifically, for example, an artificial inorganic fiber such as a ceramic fiber, a glass fiber, or a rockwool fiber can be preferably used. More specifically, for example, an alumina fiber, a mullite fiber, a silica-alumina fiber, and a silica fiber, which have excellent heat resistance, can particularly preferably be used.

Any kind of a filler can be appropriately selected as the filler without a particular limit, as long as the filler contributes to the enhancement of the characteristics such as heat resistance and strength of the disk members 11. One kind can be used alone or two or more kinds can be used in combination. More specifically, for example, an inorganic filler such as mica, wollastonite, sepiolite, silica, or alumina can be used. Among them, mica that exhibits excellent characteristics such as high elasticity, a slip property, abrasion resistance, and heat resistance can be preferably used.

The use of mica can also enhance the ability of the disk members 11 to follow the thermal expansion of the shaft portion 20 in the disk roll 1. More specifically, the shaft portion 20 is made of metal such as iron or iron steel, and hence, the shaft portion 20 expands thermally when exposed to a high temperature and extends in a longitudinal direction thereof. At this time, the thermal expansion ratio of the disk members 11 is lower than that of metal. Therefore, the disk members 11 may not follow the extension of the shaft portion 20, and the plurality of disk members 11 constituting the roll portion 10 may be separated from each other.

In this regard, mica has an extremely thin layer structure, and tends to release crystal water to effect crystal transformation when heated, and expands in a layer direction at that time. Therefore, in the case where the disk members 11 contain mica, the disk members 11 can follow the thermal expansion of the shaft portion 20 due to the expansion in the layer direction of the mica.

As mica, for example, white mica, black mica, or gold mica can be used. Among them, white mica can preferably be used because it can effectively enhance the ability to follow the above-mentioned thermal expansion.

Further, the aqueous slurry can further contain an assistant for enhancing the characteristics such as formability. As the assistant, for example, an organic material capable of being eliminated from the disk members 11 when the disk members 11 are sintered, or an inorganic material can be used. As the organic material, an organic binder such as pulp and fibers or particles of a synthetic resin can be used.

An aqueous slurry prepared as a mixture of such materials is formed into a sheet shape and dried, whereby a millboard can be produced. The millboard can be preferably obtained by a paper making method using a papermaking device. The thickness of the millboard can be set to be a desired value corresponding to the thickness of the disk members 11, and can be set to be in a range of 2 to 30 mm, for example.

Then, a part of the millboard is punched out to form a disk shape, and the punched out disk body is obtained as the disk member 11. A through-hole for allowing the shaft portion 20 to be inserted for assembly is formed at the center of the disk member 11.

Further, a disk that is punched out from the millboard, followed by being sintered, can be used as the disk member 11, or a disk obtained by punching out a millboard without sintering can also be used as the disk member 11. The sintering conditions are not particularly limited, and they can be changed appropriately in accordance with the conditions such as the specification of a sintering furnace, and the bulk density and the size of the disk member 11. More specifically, although the sintering temperature is not particularly limited, it can be set, for example, in a range of 300° C. to 1,000° C., preferably in a range of 400° C. to 900° C., and more preferably in a range of 500° C. to 800° C. Although the sintering time is not particularly limited, it can be set, for example, in a range of 1 to 24 hours.

In the case of producing the sintered disk member 11, an assistant such as an organic material contained in the millboard can be eliminated by the sintering. As a result, the disk member 11 made of a sintered inorganic material can be obtained. Further, in the sintered disk member 11, gaps derived from burning of a part of the materials involved in the sintering are formed.

The disk member 11 can also be produced by molding. More specifically, the disk member 11 can be produced, for example, by pouring the slurry prepared as a mixture of the above-mentioned materials into a mold with a predetermined shape corresponding to the shape of the disk member 11, followed by suction and dehydration. Further, the surface of a molded disk is impregnated with a clay slurry and dried, whereby the disk member 11 containing the clay can also be produced.

The molded disk member 11 can also be sintered. Further, after the disk roll 1 having the plurality of disk members 11 is assembled, the roll portion 10 containing the plurality of disk members 11 can also be sintered. Also in those cases, the sintering conditions are not particularly limited, and they can be changed appropriately in accordance with the conditions such as the specification of a sintering furnace, and the bulk density and the size of the disk member 11. More specifically, although the sintering temperature is not particularly limited, it can be set, for example, in a range of 300° C. to 1,000° C., preferably in a range of 400° C. to 900° C., and more preferably in a range of 500° C. to 800° C. Although the sintering time is not particularly limited, it can be set, for example, in a range of 1 to 24 hours.

The disk member 11 thus obtained (disk member 11 after sintering in the case of performing sintering) contains 5% by weight or more of clay. The content of the clay is preferably set to be 10% by weight or more and more preferably 15% by weight or more.

In the case where the content of the clay is less than 5% by weight, the effect of the surface treatment in the surface treatment step S102 described later cannot be obtained sufficiently. In contrast, the effect of the surface treatment can be obtained sufficiently by setting the content of the clay to be 5% by weight or more, and the effect can be obtained more positively by further increasing the content.

On the other hand, the upper limit of the content of the clay can be appropriately set in accordance with the characteristics required of the disk roll 1. More specifically, the content of the clay is preferably 75% by weight or less, more preferably 45% by weight or less, and particularly preferably 40% by weight or less. When the content of the clay exceeds 75% by weight, problems such as the occurrence of breaking, the formation of cracks, and the separation of the plurality of disk members 11 are likely to be caused in the roll portion 10, with the result that the disk roll 1 may not exhibit sufficient performance.

Thus, the content of the clay in the disk member 11 can be set, for example, in a range of 5 to 75% by weight, preferably in a range of 10 to 75% by weight, and more preferably in a range of 15 to 75% by weight. Further, for example, the content of the clay is set to be preferably in a range of 15 to 45% by weight and particularly preferably in a range of 15 to 40% by weight.

Further, the amount of the inorganic fiber and the filler to be contained in the disk member 11 can be appropriately set in accordance with the kinds of those materials and the characteristics required of the disk roll 1. More specifically, the content of the inorganic fiber is set to be, for example, preferably in a range of 0 to 50% by weight and more preferably in a range of 5 to 40% by weight. Further, the content of the filler is set to be, for example, preferably in a range of 0 to 80% by weight and more preferably in a range of 30 to 60% by weight.

In the assembly step S100, the plurality of disk members 11 thus produced are fitted by insertion onto the shaft portion 20 successively. Further, the plurality of disk members 11 stacked along the shaft portion 20 are tightened in the longitudinal direction of the shaft portion 20 by hydraulic press or the like. Then, the plurality of disk members 11 under compression are sandwiched by the pair of flanges 21 provided at both ends of the shaft portion 20 and fixed further with the pair of nuts 22. However, the plurality of disk members 11 may be fixed with the flanges 21 and the nuts 22 without compression after being fitted onto the shaft portion 20.

Thus, the disk roll 1 having the roll portion 10 formed of the plurality of stacked disk members 11 can be assembled. The roll portion 10 are hardened more and made denser, compared with each disk member 11 before assembling, by compressing and fixing the plurality of disk members 11.

The roll portion 10 is not limited to the one that has the plurality of stacked disk members 11 as described above. Specifically, the roll portion 10 can also be, for example, one cylindrical molded body containing 5% by weight or more of clay. Further, the roll portion 10 can be configured in such a manner that a plurality of cylindrical molded bodies containing 5% by weight or more of clay are stacked along the shaft portion 20.

Such a cylindrical molded body can be produced, for example, by molding, using materials mainly containing the above-mentioned inorganic materials. In this case, the roll portion 10 is produced as a cylindrical molded body by pouring the slurry prepared as a mixture of the above-mentioned materials into a mold with a predetermined shape corresponding to the shape of the roll portion 10, followed by suction and dehydration. In this case, the slurry may contain clay before molding. Further, the surface of the cylindrical molded body formed by molding is impregnated with clay slurry and dried, whereby the roll portion 10 containing the clay can also be produced.

Further, the roll portion 10 can also be an inorganic fiber molded body containing clay between fibers. More specifically, the roll portion 10 can be, for example, a sheet-shaped inorganic fiber molded body containing clay between fibers wound around the shaft portion 20 once or a plurality of times.

In this case, the roll portion 10 can be produced, for example, by impregnating an inorganic fiber molded body with clay slurry. Specifically, for example, inorganic fiber paper is impregnated with clay slurry, and then, the inorganic fiber paper is wound around the shaft portion 20, whereby the roll portion 10 can be produced. Further, for example, inorganic fiber paper containing the clay is produced by subjecting slurry containing clay to papermaking, and then, the roll portion 10 can also be produced using the inorganic fiber paper. Further, an inorganic fiber blanket is wound around the shaft portion 20, and then, the inorganic fiber blanket is impregnated with clay slurry, followed by drying, whereby the roll portion 10 can also be produced.

Those cylindrical molded bodies and inorganic fiber molded bodies can also be sintered. Further, a heat-resistant roll equipped with the roll portion 10 having the plurality of disk members 11, cylindrical molded bodies, or inorganic fiber molded bodies as described above is assembled, and thereafter, the roll portion 10 can also be sintered. Further, the roll portion 10 can also be sintered after the roll portion 10 is subjected to surface treatment in the surface treatment step S102 described later. In those cases, the sintering conditions are not particularly limited, and they can be changed appropriately in accordance with the conditions such as the specification of a sintering furnace, and the bulk density and the size of the cylindrical molded body and the inorganic fiber molded body. More specifically, although the sintering temperature is not particularly limited, it can be set, for example, in a range of 300° C. to 1,000° C., preferably in a range of 400° C. to 900° C., and more preferably in a range of 500° C. to 800° C. Although the sintering time is not particularly limited, it can be set, for example, in a range of 1 to 24 hours.

In the grinding step S101, the roll surface 12 of the disk roll 1 assembled in the assembly step S100 is ground. Specifically, a part of the roll surface 12 in a dry state is scraped off, whereby the roll surface 12 is smoothened and the diameter of the roll portion 10 is adjusted.

For example, as illustrated in FIG. 1, the diameter of the roll portion 10 in the longitudinal direction can be adjusted to be constant. The grinding method is not particularly limited, and for example, a grinding device such as a turning machine or a grinding tool such as sand paper can be used.

Grinding conducted in the grinding step S101 is conventionally performed for finishing the roll surface 12. Thus, the ground roll surface 12 is smoothened more satisfactorily compared with that before grinding.

However, the inventors of the present invention carried out intensive studies, considering that the merely ground roll surface 12 may not address the increase in quality required of a sheet glass product sufficiently. Then, the inventors decided to provide the surface treatment step S102 described below as a further finishing step.

In the surface treatment step S102, the roll surface 12 ground in the grinding step S101 is subjected to surface treatment in which the roll surface 12 is smoothened in a wet state. Specifically, in the surface treatment, first, the dried roll surface 12 after grinding is wetted.

More specifically, the roll surface 12 in a dry state is newly impregnated with liquid. Any kind of liquid can be appropriately selected and used as the liquid without a particular limit, as long as the roll surface 12 can be impregnated with the liquid. One kind can be used alone or two or more kinds can be used in combination. Specifically, polar solvents such as water, ethanol, and acetone can be used preferably. Among them, water can be used particularly preferably since water is easy to handle and can plasticize clay effectively.

The roll surface 12 containing 5% by weight or more of clay can be plasticized by being wetted. Specifically, fine particles constituting the roll surface 12 are hardened and bound strongly in a dry state. However, they become soft and can be deformed and moved relatively easily in a wet state.

In the surface treatment step S102, an external force is further applied to the wet roll surface 12 to smoothen the roll surface 12. Specifically, for example, the wet roll surface 12 is rubbed to apply a shear force in the direction along the roll surface 12.

Thus, some of the fine particles constituting the roll surface 12 can be moved along the roll surface 12. As a result, the concavity and convexity on the roll surface 12 can be reduced.

Specifically, for example, the fine particles constituting convex portions of the roll surface 12 are moved along the roll surface 12 and buried in the concave portions of the roll surface 12, whereby the roll surface 12 can be smoothened effectively.

Further, by applying a force to press the roll surface 12, the fine particles constituting the roll surface 12 can also be filled up more densely. Specifically, the fine particles can move while being shifted from each other on the wet roll surface 12. Therefore, the fine particles can be rearranged and buried again so as to be dispersed uniformly by a load under an appropriate pressure. As a result, the roll surface 12 can be made denser effectively.

Accordingly, in the present method of production, the surface treatment as described above is performed as finishing of the roll surface 12 after grinding, whereby the roll surface 12 is smoothened effectively and can be made denser.

Figure 4:
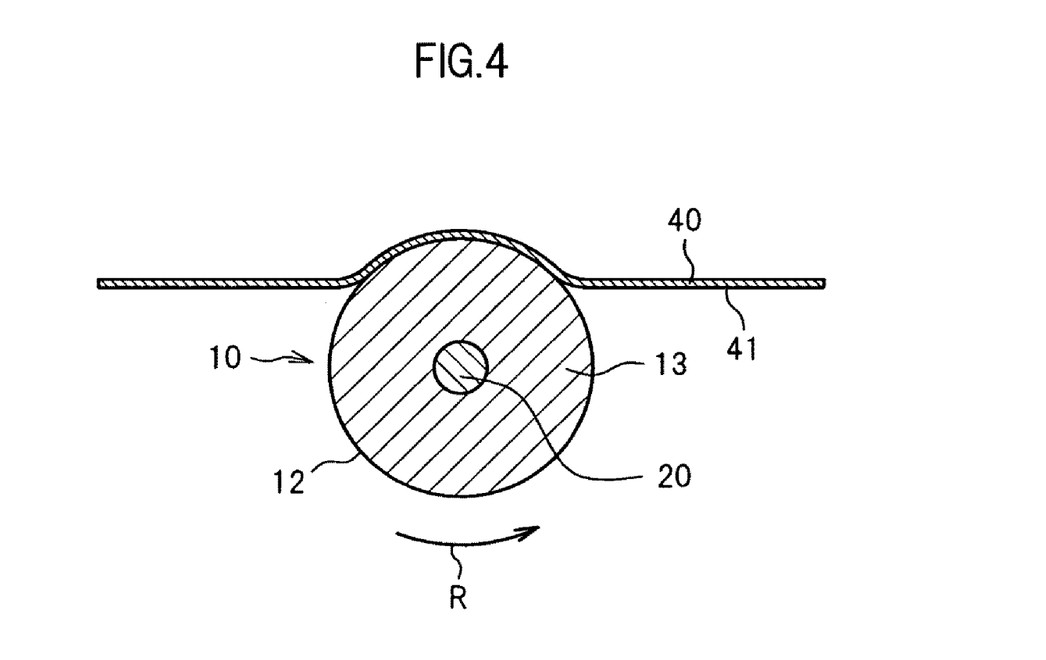
FIG. 4 is an explanatory view illustrating an example of surface treatment using a substrate in the method of producing a heat-resistant roll according to an embodiment of the present invention.

FIG. 4 illustrates an example of an embodiment preferable for realizing the above-mentioned surface treatment. FIG. 4 illustrates a cross-section of the roll portion 10 taken along a line IV-IV of the disk roll 1 illustrated in FIG. 1, and a cross-section of a substrate 40 used for the surface treatment with respect to the roll portion 10.

As illustrated in FIG. 4, in this example, the wet substrate 40 is pressed against the rotating roll surface 12, whereby the above-mentioned surface treatment is performed. Specifically, the roll portion 10 is first rotated in a direction indicated by an arrow R illustrated in FIG. 4 with respect to the shaft portion 20 as a center of rotation.

Then, the substrate 40 previously impregnated with liquid such as water is pressed against the rotating roll surface 12, and the state is maintained. At this time, as illustrated in FIG. 4, it is preferred that the substrate 40 be placed along the roll surface 12. Although FIG. 4 illustrates only the state in which the substrate 40 is placed along the circumferential direction of the roll surface 12, the substrate 40 can also be placed along the longitudinal direction of the roll surface 12. Thus, the roll surface 12 is rotated while being in contact with the wet surface 41 of the substrate 40.

Herein, any kind of substrate can be appropriately selected and used as the substrate 40 without a particular limit, as long as the substrate can be impregnated with liquid in an amount required for wetting the roll surface 12, and a friction force required for smoothening the roll surface 12 can be applied to the roll surface 12.

Specifically, for example, a fiber substrate or a porous substrate capable of retaining liquid such as water can be used as the substrate 40. Specifically, for example, in the case of performing surface treatment using water, a water-containing fiber substrate or porous substrate, composed of a hydrophilic material, can preferably be used.

Further, for example, the substrate having the surface 41 with roughness (such as concavity and convexity) for grinding that comes into contact with the roll surface 12 can be used as the substrate 40. Specifically, for example, the substrate 40 with the surface 41 to which an abrasive is bonded can be used. Specifically, for example, a sheet-shaped substrate having a surface with roughness for grinding, such as a sand paper, can be used preferably.

Further, as illustrated in FIG. 4, the substrate 40 having flexibility, which can be placed along the roll surface 12, can preferably be used. Specifically, for example, a sheet-shaped fiber substrate such as woven fabric and nonwoven fabric and a sheet-shaped porous substrate (for example, foamed molding) made of a synthetic polymer having flexibility can preferably be used. Further, the sheet-shaped substrate 40 (for example, sandpaper) having the surface 41 with roughness for grinding as described above can also preferably be used.

As illustrated in FIG. 4, the surface treatment can be performed extremely efficiently by rotating the roll surface 12 while the wet substrate 40 is placed along the roll surface 12. Specifically, first, the wet substrate 40 covers a part of the roll surface 12, and hence, the roll surface 12 can be wetted efficiently by controlled release of liquid (moisture) from the substrate 40, and the roll surface 12 that gets wet once can be effectively prevented from being dried again.

Further, the wet roll surface 12 and the wet substrate surface 41 rub against each other while being pressed against each other appropriately, whereby the fine particles constituting the roll surface 12 can be moved effectively. As a result, the unevenness present on the roll surface 12 before the surface treatment collapses to be reclaimed, whereby the roll surface 12 can be smoothened and made dense as described above.

Further, in the surface treatment step S102, two-stage surface treatment can also be performed. Specifically, in this case, the surface treatment is performed by carrying out a first step of wetting the roll surface 12 ground in the grinding step S101 and a second step of smoothening the wet roll surface 12.

In the first step, the roll surface 12 in a dry state is newly impregnated with liquid. A method of impregnating the roll surface 12 with liquid is not particularly limited. For example, a method of spraying liquid onto the roll surface 12 with a spraying tool such as a sprayer and a method of bringing the substrate 40 preliminarily retaining liquid into contact with the roll surface 12 can be used.

The treatment in the first step can also be performed while the roll portion 10 is being rotated. Specifically, for example, liquid is sprayed onto the rotating roll surface 12 or the roll portion 10 is rotated while the substrate 40 preliminarily retaining liquid is pressed against the roll surface 12, whereby the roll surface 12 can be wetted. Needless to say, the roll surface 12 can be wetted without rotating the roll portion 10.

In the subsequent second step, the roll surface 12 is smoothened. Specifically, an external force is applied to the roll surface 12 wetted previously in the first step, whereby the roll surface 12 is smoothened. Specifically, for example, as described above, the roll portion 10 is rotated while the substrate 40 is pressed against the wet roll surface 12, whereby the roll surface 12 is smoothened.

Herein, there is no particular limit on the substrate 40 used in the second step, as long as the roll surface 12 can be smoothened and made dense as described above when the substrate is pressed against the rotating roll surface 12. Specifically, for example, the sheet-shaped substrate 40 can preferably be used. In this case, during the second step, the sheet-shaped substrate 40 is pressed against the wet roll surface 12, and the roll portion 10 is rotated while the substrate 40 is placed along the circumferential direction of the roll surface, whereby the roll surface 12 is smoothened.

Further, for example, the sheet-shaped substrate 40 having the surface 41 with roughness for grinding on the surface that comes into contact with the roll surface 12, such as sandpaper, can preferably be used. The use of the substrate 40 having such a grinding ability enables the fine particles constituting the roll surface 12 to be moved and buried again effectively as described above. Consequently, the roll surface 12 can be smoothened and made dense effectively.

Further, in the surface treatment step S102, the roll surface 12 of the roll portion 10 rotating in one circumferential direction is subjected to the above-mentioned surface treatment, and subsequently, a repeated surface treatment in which the surface treatment is performed with a rotation direction of the roll portion 10 being switched to an opposite direction may be performed. Such repeated treatment can also be performed at least once.

Specifically, in this case, first, the surface treatment of smoothing the roll surface 12 in a wet state is performed while the roll portion 10 is rotated in one circumferential direction (for example, direction indicated by an arrow R illustrated in FIG. 4). The surface treatment may be performed in two stages as described above.

Next, the rotation direction of the roll potion 10 is switched to the opposite direction without drying the roll surface 12 after the surface treatment, whereby repeated treatment is performed. Specifically, in the repeated treatment, the surface treatment of smoothening the roll surface 12 in a wet state is performed while the roll portion 10 is rotated in another circumferential direction (for example, direction opposite to the direction indicated by the arrow R illustrated in FIG. 4).

Further, in the case of performing the second repeated treatment, the rotation direction of the roll portion 10 is switched to the opposite direction again without drying the roll surface 12 after the first repeated treatment. Specifically, in the second repeated treatment, the surface treatment of smoothing the roll surface 12 in a wet state is performed while the roll portion 10 is rotated in one circumferential direction (for example, direction indicated by an arrow R illustrated in FIG. 4) again.

Then, in the case of performing three or more repeated treatments, similarly, the rotation direction of the roll portion 10 is switched, whereby the surface treatment of the roll surface 12 of the roll portion 10 rotating in the direction after switching is performed. The surface treatment in the repeated treatment may also be performed in two stages as described above.

In the surface treatment step S102, a pressure force applied to the roll surface 12 so as to smoothen the roll surface 12 is not particularly limited, and can be arbitrarily set in a range in which the roll surface 12 can be smoothened and made dense as described above.

Specifically, in the case where the roll surface 12 is smoothened by pressing the substrate 40 (sheet-shaped substrate 40 having a grinding ability such as sandpaper) against the roll surface 12 as described above, a pressure force (i.e., pressure force in a range of 100 to 2,000 N/mm) in a range of 100 to 2,000 N per unit length (1 mm) of the substrate 40 in the width direction (longitudinal direction of the shaft portion 20) can be applied to the roll surface 12. In this case, the pressure force is preferably set to be in a range of 200 to 1,200 N/mm and more preferably 400 to 800 N/mm.

Further, in the surface treatment step S102, the speed at which the roll surface 102 is rotated when the roll surface 12 is smoothened is not particularly limited and can be set arbitrarily in a range in which the roll surface 12 can be smoothened and made dense as described above.

Specifically, the rotation speed of the roll portion 10 can be set, for example, in a range of 10 to 1,500 rpm, preferably in a range of 20 to 400 rpm, and more preferably in a range of 40 to 100 rpm. Further, the circumferential speed of the roll surface 12 can be set to be, for example, in a range of 1 to 1,000 m/min., preferably in a range of 5 to 200 m/min., and more preferably 10 to 100 m/min.

In the surface treatment step S102, the roll surface 12 that has been subjected to the surface treatment as described above is finally dried. Specifically, the liquid such as water, with which the roll surface 12 is impregnated for wetting, is evaporated, and the roll surface 12 is dried again. A method of drying the roll surface 12 is not particularly limited, and for example, the roll surface 12 can also be dried more efficiently and reliably by heating.

The roll surface 12 that has been smoothened and made dense is hardened by drying. Specifically, on the roll surface 12 that has been subjected to the surface treatment and dried, fine particles dispersed uniformly and buried densely are bound to each other strongly. Thus, the fine particles are efficiently prevented from coming off from the roll surface 12 after the surface treatment.

Thus, according to the present method of production including the surface treatment step S102, the disk roll 1 in which the roll surface 12 is highly smoothened and dust-generating risk is reduced effectively can be produced easily and efficiently.

In the disk roll 1 thus obtained, the roll surface 12 is made denser compared with an inside 13 of the roll portion 10. Specifically, in the roll portion 10, a surface portion with a predetermined thickness including the outer surface of the roll portion 10 and a vicinity thereof are made dense locally.

Specifically, the fine particles constituting the roll surface 12 are dispersed more uniformly and buried more densely, compared with the fine particles constituting the inside 13 of the roll portion 10. Therefore, the roll surface 12 constitutes a kind of coating film covering the outer surface of the roll portion 10, thereby exhibiting excellent characteristics as described above.

The disk member 11 is obtained by punching out a millboard, and hence no difference is present originally in density between the outer circumferential surface and the inside. Further, the above-mentioned grinding treatment (i.e., conventional finishing treatment) is to scrape the unevenness on the outer circumferential surface of the dried disk member 11 off, which does not make the outer circumferential surface dense.

Further, the roll surface 12 is highly smoothened. Specifically, an arithmetic average roughness Ra of the roll surface 12 measured by a method defined by JIS B 0601-1994 can be set to be 5.0 µm or less, more preferably 3.0 µm or less, and particularly preferably 1.0 µm or less.

Further, a maximum height Ry of the roll surface 12 measured by a method defined by JIS B 0601-1994 can be set to be 25.0 μm or less, more preferably 15.0 μm or less, and particularly preferably 10.0 μm or less.

Further, a ten-point average roughness Rz of the roll surface 12 measured by a method defined by JIS B 0601-1994 can be set to be 25.0 μm or less, more preferably 15.0 μm or less, and particularly preferably 10.0 μm or less.

In the roll surface 12, at least one of the arithmetic average roughness Ra, the maximum height Ry, and the ten-point average roughness Rz is preferably in the above-mentioned range, and it is particularly preferred that all those three factors be in the above-mentioned ranges.

Thus, the roll surface 12 is highly smoothened. Therefore, for example, as illustrated in FIGS. 2 and 4, even in the case where the whole or a part of the roll surface 12 comes into contact with the glass ribbon 30, the defects of a sheet glass product, as well as damage to the glass ribbon 30, can be effectively avoided.

The roll portion 10 can maintain the same heat resistance before and after the surface treatment. Specifically, for example, it is possible to employ a technology of smoothening the roll surface 12 by impregnating the roll surface 12 with a coating agent to newly form a coating film. However, in this case, the heat resistance of the disk roll 1 may be degraded remarkably due to the formation of the coating film.

In contrast, the above-mentioned surface treatment in the present method of production is such that the roll surface 12 is wetted with liquid such as water and smoothened, and thereafter, the liquid is removed from the roll surface 12 to dry the roll surface 12 again. Therefore, the change in composition of the roll surface 12 and the decrease in heat resistance involved in the change can be effectively avoided.

Particularly, in the case where the surface treatment is performed by impregnating the roll surface 12 with liquid substantially containing no solute (e.g., water), the liquid with which the roll surface 12 is impregnated once is removed almost completely from the roll surface 12 in a stage of the final re-drying.

Thus, in this case, there is no substantial change in composition of the roll surface 12 before and after the surface treatment, and heat resistance does not decrease. Specifically, the roll surface 12 can maintain the heat resistance based on the material composition before the surface treatment even after the roll surface 12 is smoothened and made dense by the surface treatment. In the case where the roll surface 12 is wetted using a solution containing a solute, an appropriate solute such as a solute having excellent heat resistance can be selected and used so that the decrease in heat resistance caused by the remaining solute on the roll surface 12 after re-drying is avoided or minimized.

Next, specific examples of the present method of production and the disk roll 1 are described.

EXAMPLE 1

A disk roll 1 with a configuration illustrated in FIG. 1 was produced by the above-mentioned present method of production. More specifically, first, the plurality of disk members 11 were produced as disks punched out from a millboard.

The disk member 11 contained 35% by weight of Kibushi clay as clay, 15% by weight of alumina-silica fibers as inorganic fibers, and 40% by weight of wollastonite as a filler. The millboard contained 5% by weight of pulp and 5% by weight of organic binder as assistants.

Then, the plurality of disk members 11 were fitted by insertion onto a shaft portion 20 made of steel, and fixed with flanges 21 and nuts 22 under a compressed state. Thus, the disk roll 1 having a roll portion 10 in which the plurality of disk members 11 were stacked was assembled. Further, the disk roll 1 thus assembled was sintered. The pulp and organic binder contained in the disk members 11 were burnt off due to sintering.

Then, roll surface 12 of the disk roll 1 was ground. The grinding was performed by setting the disk roll 1 in a predetermined driving device and rotating the disk roll 1 with respect to the shaft portion 20, and bringing sand paper into contact with the rotating roll surface 12.

As finishing treatment, dust-free paper (Kimwipe manufactured by NIPPON PAPER CRECIA Co., LTD.) preliminarily impregnated with water to be wet was pressed against the roll surface 12 rotating in the same way as in the grinding and held for a predetermined time, whereby the surface treatment of smoothing the roll surface 12 in a wet state was performed.

Finally, the roll surface 12 after the surface treatment was heated and dried. Thus, the disk roll 1 (hereinafter, referred to as "present product") having the roll surface 12 subjected to surface treatment was produced.

Next, the surface roughness and dust-generating property (powder drop property) of the roll surface 12 were evaluated. The surface roughness was measured by a method defined by JIS B 0601-1994, using a contact type surface roughness measuring instrument (JIS B 0651), and an arithmetic average roughness Ra, a maximum height Ry, and a ten-point average roughness Rz were evaluated. The dust-generating property was evaluated by rubbing the roll surface 12 against black drawing paper, measuring the weight of powder adhering to the drawing paper, and measuring the lightness of the drawing paper with a color difference meter.

Further, the roll portion 10 was disassembled by removing the flanges 21 and the nuts 22, and the outer circumferential surface (i.e., surface constituting a part of the roll surface 12) of the separated disk member 11 was observed with a scanning electron microscope (SEM).

Further, for comparison, a disk roll having the roll surface 12 merely subjected to grinding (hereinafter, referred to as "comparative product I") and a disk roll having the roll surface 12 which was sprayed to be wetted with water droplets by a sprayer after being ground and dried again without being smoothened (hereinafter, referred to as "comparative product II") were prepared, and those disk rolls were evaluated for the surface roughness and the dust-generating property and observed with the SEM.

Figure 5A:
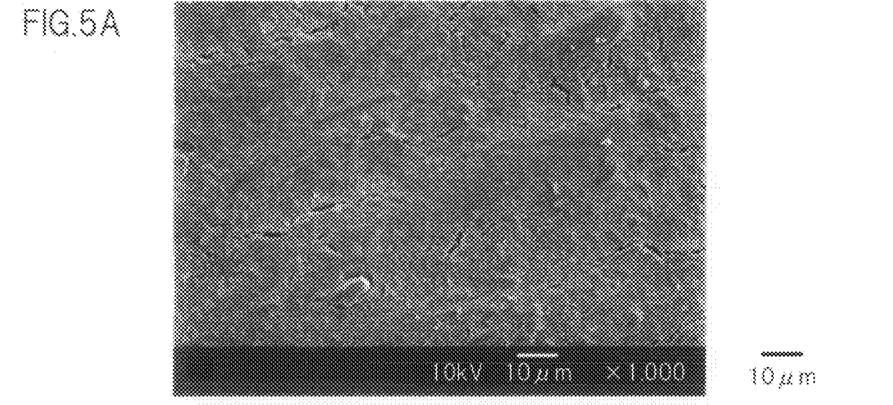
FIG. 5 are electron micrographs illustrating an example of the results obtained by observing the heat-resistant roll according to an embodiment of the present invention with a scanning electron microscope.
Figure 5B:
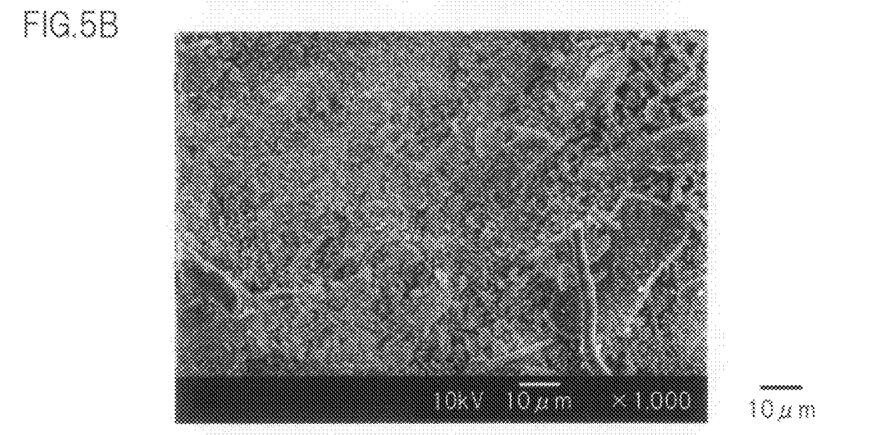
Figure 5C:
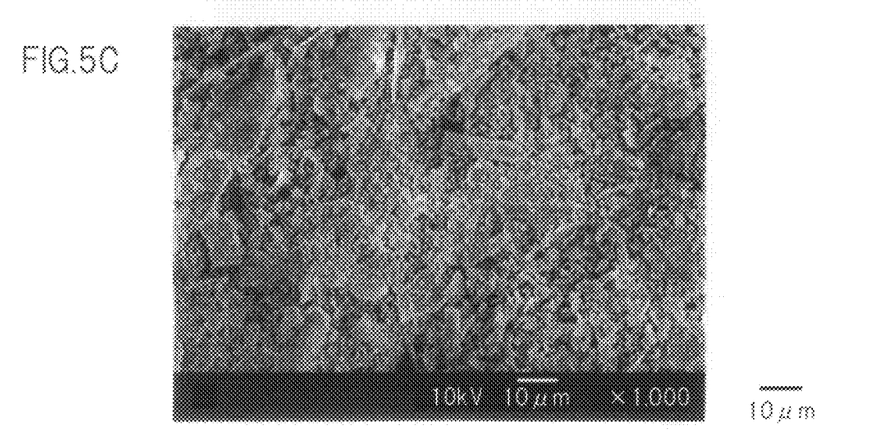

FIGS. 5 and 6 illustrate examples of the results of the SEM observation. FIG. 5 illustrates examples of the SEM pictures (magnification: 1000 times) of the present product (A), the comparative product I (B), and the comparative product II (C). The length of a scale bar illustrated in FIG. 5 is 10 μm.

Figure 6A:
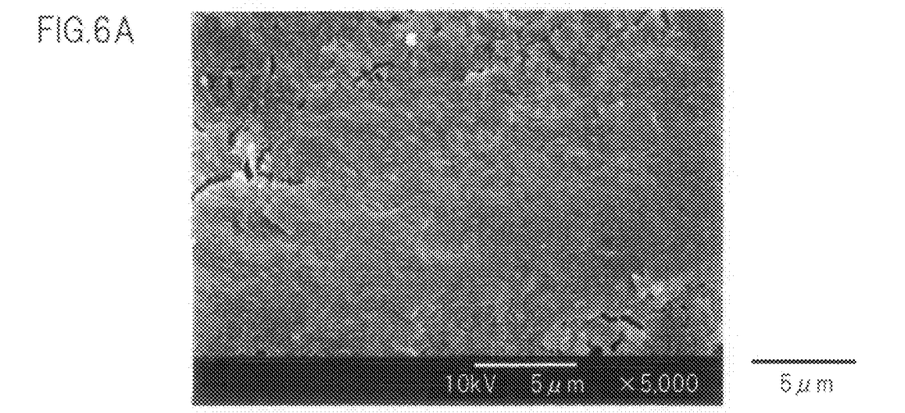
FIG. 6 are electron micrographs illustrating another example of the results obtained by observing the heat-resistant roll according to an embodiment of the present invention with a scanning electron microscope.
Figure 6B:
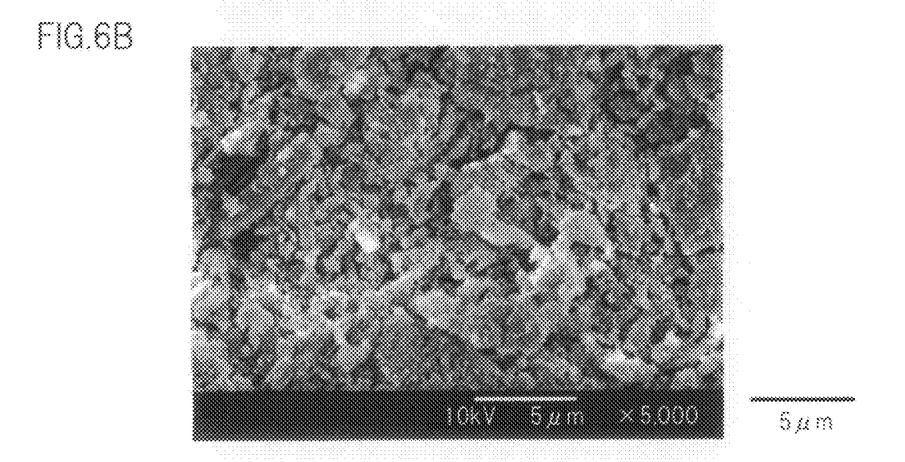
Figure 6C:
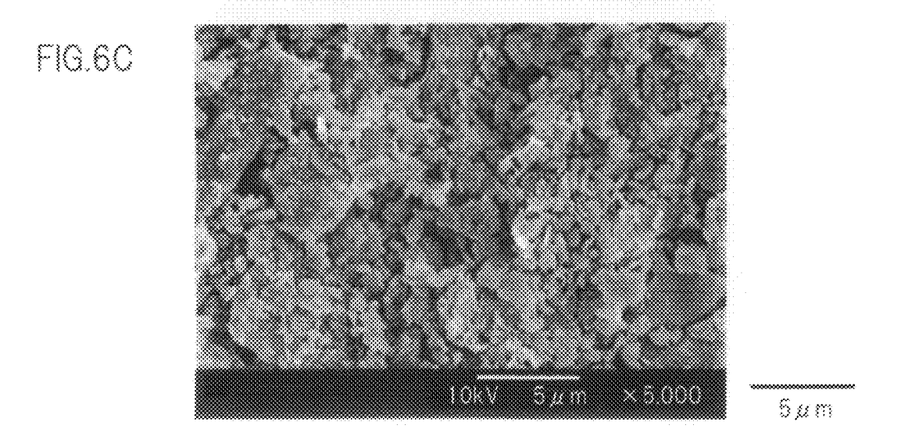

FIG. 6 illustrates examples of the SEM pictures (magnification: 5,000 times) of the present product (A), the comparative product I (B), and the comparative product II (C). The length of a scale bar illustrated in FIG. 6 is 5 μm.

As illustrated in FIGS. 5 and 6, on the roll surfaces 12 of the comparative product I (B) and the comparative product II (C), concavity and convexity were observed to such a degree that fine particles or fiber chips constituting the roll surfaces 12 were identified.

In contrast, on the roll surface 12 of the present product (A), concavity and convexity were reduced remarkably compared with those of the comparative product I (B) and the comparative product II (C), and thus fine particles or fiber chips constituting the roll surface 12 were not identified.

More specifically, it was confirmed that the roll surface 12 of the present product (A) is extremely smoothened and made highly dense.

Figure 7:
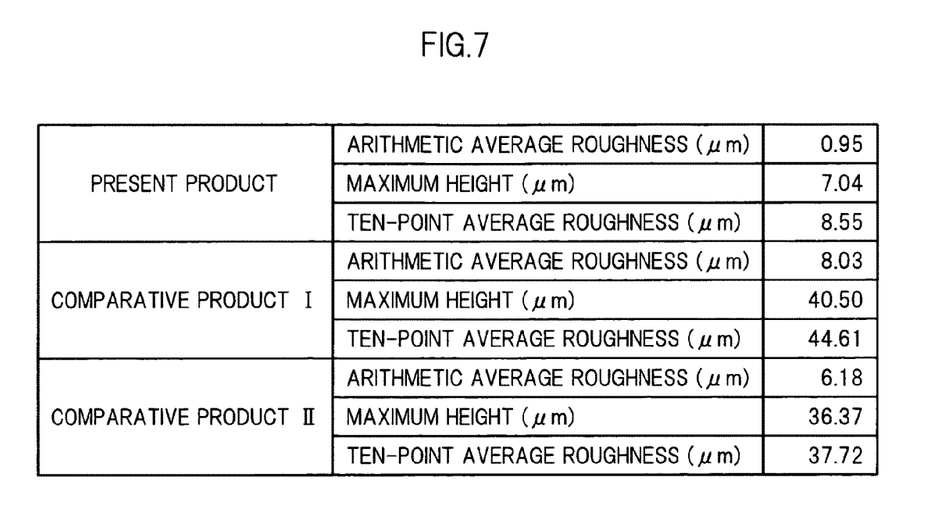
FIG. 7 is an explanatory view illustrating an example of the results obtained by evaluating the surface roughness of the heat-resistant roll according to an embodiment of the present invention.

FIG. 7 illustrates examples of the results obtained by evaluating the surface roughness. FIG. 7 illustrates the results obtained by evaluating the arithmetic average roughness Ra (μm), the maximum height Ry (μm), and the ten-point average roughness Rz (μm) defined by JIS B 0601-1994, regarding the present product, the comparative product I, and the comparative product II. Each value illustrated in FIG. 7 is an arithmetic average value of the results obtained by measuring at three different points for each roll surface 12.

As illustrated in FIG. 7, the arithmetic average roughness Ra (μm) of the comparative product I was 8.03, whereas that of the comparative product II was low (i.e., 6.18), and that of the present product was remarkably low (i.e., 0.95). Further, the maximum height Ry (μm) of the comparative product I was 40.50, whereas that of the comparative product II was low (i.e., 36.37), and that of the present product was remarkably low (i.e., 7.04). Further, the ten-point average roughness Rz (μm) of the comparative product was 44.61, whereas that of the comparative product II was low (37.72), and that of the present product was remarkably low (i.e., 8.55).

Thus, even in the comparative product II in which the roll surface 12 was once wetted and dried again, the reduction in surface roughness was found compared with the comparative product I in which the surface roughness 12 was merely ground. Compared with them, the surface roughness of the present product was reduced remarkably. Those results support the high smoothening of the present product, which is matched with the results of the SEM observation illustrated in FIGS. 5 and 6.

Figure 8:
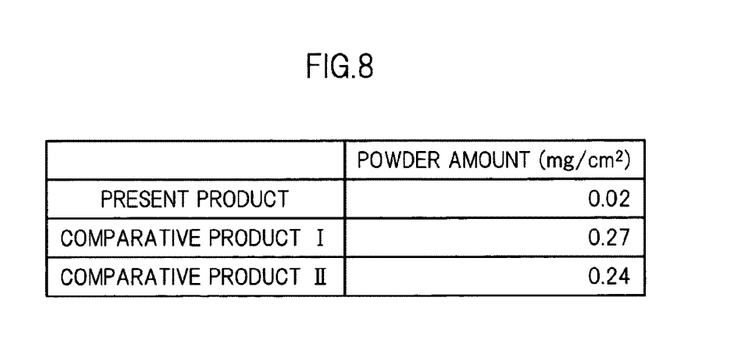
FIG. 8 is an explanatory view illustrating an example of the results obtained by evaluating the dust-generating risk of the heat-resistant roll according to an embodiment of the present invention.
Figure 9:
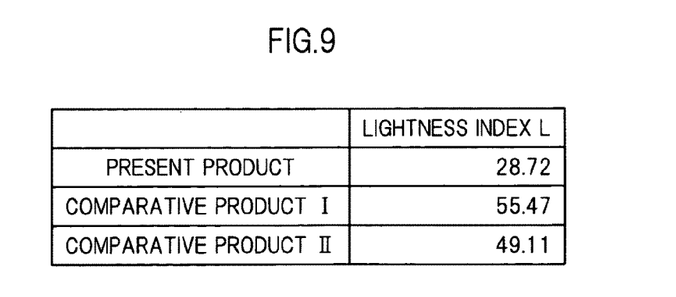
FIG. 9 is an explanatory view illustrating another example of the results obtained by evaluating the dust-generating risk of the heat-resistant roll according to an embodiment of the present invention.

FIGS. 8 and 9 illustrate examples of the results obtained by evaluating the dust-generating property. FIG. 8 illustrates the results obtained by measuring the amount (mg/cm$^2$) of powder adhering to the drawing paper per 1 cm$^2$ after the roll surface 12 was rubbed against the drawing paper, for the present product, the comparative product I, and the comparative product II.

As illustrated in FIG. 8, the amount (mg/cm$^2$) of powder of the comparative product I was 0.27, whereas that of the comparative product II was low (i.e., 0.24) and that of the present product was remarkably low (i.e., 0.02).

FIG. 9 illustrates the results obtained by measuring a lightness index L of the black drawing paper after the roll surface 12 was rubbed against the black drawing paper, for the present product, the comparative product I, and the comparative product II. FIG. 9 illustrates that, as the lightness index L is higher, the amount of powder adhering to the drawing paper is larger.

As illustrated in FIG. 9, the lightness index of the comparative product I was 55.47, whereas that of the comparative product I was low (i.e., 49.11), and that of the present product was remarkably low (i.e., 28.72).

The lightness index L of the drawing paper which the roll surface 12 was not rubbed against was 28.67, and hence it was confirmed that powder hardly dropped from the roll surface 12 of the present product. Thus, the dust-generating property of the roll surface 12 of the present product were decreased remarkably compared with the comparative products I and II.

EXAMPLE 2

Eight kinds of the disk rolls 1 with the configuration as illustrated in FIG. 1 were produced by the above-mentioned present method of production, and each disk roll 1 was evaluated for the characteristics in the same way as in Example 1.

Figure 10:
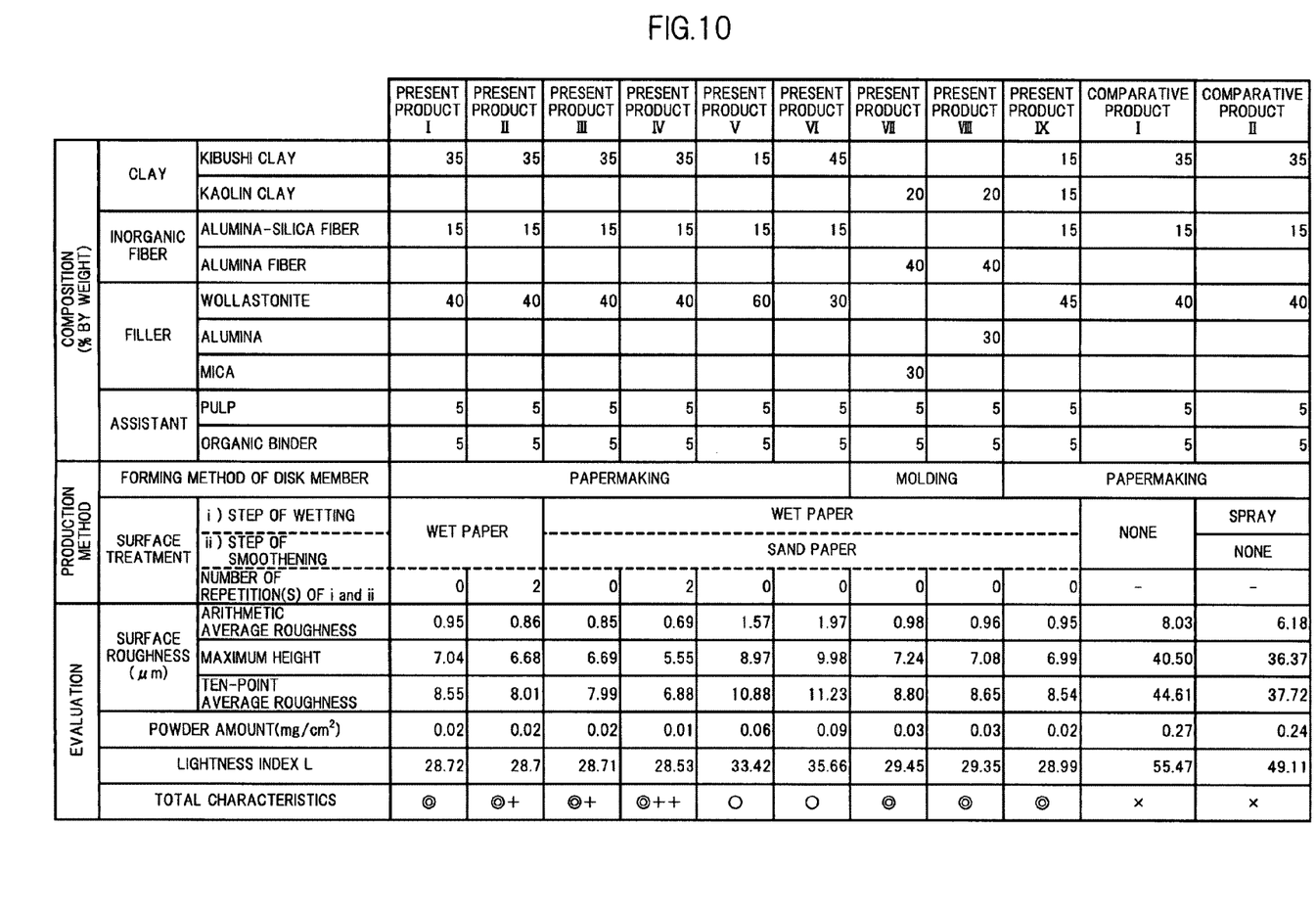
FIG. 10 is an explanatory view illustrating an example of the results obtained by evaluating the characteristics of the heat-resistant rolls in the case of changing production conditions of disk members for the heat-resistant rolls according to an embodiment of the present invention.

FIG. 10 illustrates the results obtained by evaluating the composition (% by weight) of materials for the disk member 11 and the forming method thereof, the surface treatment method of the roll surface 12, and the characteristics of the produced disk roll 1, for the eight kinds of disk rolls 1 produced in Example 2 (hereinafter, referred to as "present product II" to "present product IX", respectively), the present product obtained in Example 1 (hereinafter, referred to as "present product I"), and the comparative products I and II obtained in Example 1.

In FIG. 10, the column "composition (% by weight)" refers to the composition of materials used for producing the disk member 11. Further, the "papermaking method" described in the column "forming method of disk member" shows that a millboard is produced from an aqueous slurry of the composition shown in the "composition (% by weight)" by the paper making method, and the millboard is punched out to produce the disk member 11. On the other hand, the "molding" described in the column "forming method of disk member" shows that an aqueous slurry of the composition shown in the column "composition (% by weight)" is molded to produce the disk member 11.

In the column "surface treatment" in FIG. 10, the description "wet paper" listed across the column "i) step of wetting" and "ii) step of smoothing" (present products I, II) shows that the surface treatment is performed in such a manner that dust-free paper (Kimwipe manufactured by NIPPON PAPER CRECIA Co., LTD.) preliminarily impregnated with water to be wet is pressed against the rotating roll surface 12 and held for a predetermined time, whereby the roll surface 12 is wetted and smoothened.

On the other hand, the descriptions "wet paper" in the column "i) step of wetting" and "sand paper" in the column "ii) step of smoothing" (Present products III to IX) show that the above-mentioned surface treatment is performed in two stages. More specifically, in this case, the surface treatment was performed in such a manner that dust-free paper preliminarily impregnated with water to be wet was pressed against the rotating roll surface 12, whereby the roll surface 12 was wetted. Then, the sand paper was pressed against the wetted roll surface 12 instead of the dust-free paper and held for a predetermined time, whereby the roll surface 12 was smoothened.

The numerical values described in "number of repetition of to ii" in the column "surface treatment" in FIG. 10 refers to the number of surface treatments performed with the rotation direction of the roll surface 12 switched. More specifically, in the present products II, IV, the roll surface 12 rotating in one circumferential direction was subjected to the surface treatment, the rotation direction was switched without drying the roll surface 12, the roll surface 12 rotating in the other direction was subjected to the surface treatment, the rotation direction was switched again without drying the roll surface 12, and the roll surface 12 rotating in the one circumferential direction was subjected to the surface treatment.

The "surface roughness (μm)", "powder amount (mg/cm$^2$)", and "lightness index L" in the column "evaluation" in FIG. 10 show the evaluation results obtained in the same way as in Example 1. Further, the "total characteristics" in the column "evaluation" refers to the results obtained by totally evaluating the characteristics required in the use of the disk roll 1 as a heat-resistant conveying roll in the production of a sheet glass. Herein, "⊙" shows that the characteristics are very good in terms of practical use. In particular, "⊙+" shows that the characteristics are excellent, and "⊙++" shows that the characteristics are extremely excellent. Further, "○" indicates that the characteristics are satisfactory to such a degree that no practical problems arise, and "x" indicates that the characteristics are not preferable in terms of practical use.

As illustrated in FIG. 10, all the nine kinds of the present products I to IX having different compositions of the disk member 11, forming method thereof, and surface treatment method of the roll surface 12 had excellent characteristics, compared with those of the comparative products I, II that were not subjected to the surface treatment of the present invention.

Further, the present product II having the disk member 11 subjected to three surface treatments by switching the rotation direction of the roll surface 12 twice had excellent characteristics, compared with those of the present product I having the disk member 11 subjected to only one surface treatment.

Further, the present product III having the disk member 11 subjected to the surface treatment in two stages using wet paper and sand paper had excellent characteristics, compared with the present product I having the disk member 11 subjected to the surface treatment in one stage using only wet paper.

Further, the present product IV having the disk member 11 subjected to three surface treatments in two stages by switching the rotation direction of the roll surface 12 twice had excellent characteristics, compared with those of the present product III having the disk member 11 subjected to only one surface treatment.

What is claimed is:

1. A method of producing a heat-resistant roll equipped with a roll portion containing 5% by weight or more of clay, comprising:
    a grinding step of grinding a roll surface of the roll portion; and
    a surface treatment step of performing surface treatment of smoothening the ground roll surface in a wet state.

2. A method of producing a heat-resistant roll according to claim 1, wherein, in the surface treatment step, the surface treatment is performed by conducting a first step of wetting the ground roll surface and a second step of smoothening the wet roll surface.

3. A method of producing a heat-resistant roll according to claim 2, wherein, in the second step, the roll surface is smoothened by rotating the roll portion while pressing a substrate against the wet roll surface.

4. A method of producing a heat-resistant roll according to claim 1, wherein, in the surface treatment step, the surface treatment is performed by pressing a wet substrate against the roll surface of the rotating roll portion.

5. A method of producing a heat-resistant roll according to claim 1, wherein, in the surface treatment step, the surface treatment is performed on the roll surface of the roll portion rotating in one circumferential direction, and subsequently, a repeated surface treatment in which the surface treatment is performed with a rotation direction of the roll portion being switched to an opposite direction is performed at least once.

* * * * *